(12) United States Patent
Matsui et al.

(10) Patent No.: US 10,147,009 B2
(45) Date of Patent: Dec. 4, 2018

(54) DISPLAY-OBJECT INFORMATION DISPLAYING APPARATUS

(71) Applicant: DENSO CORPORATION, Kariya, Aichi-pref. (JP)

(72) Inventors: Kazuhiro Matsui, Kariya (JP); Takahira Kato, Kariya (JP); Takamitsu Suzuki, Kariya (JP); Yuko Nakamura, Kariya (JP); Takeshi Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 132 days.

(21) Appl. No.: 15/121,284

(22) PCT Filed: Mar. 5, 2015

(86) PCT No.: PCT/JP2015/001159
§ 371 (c)(1),
(2) Date: Aug. 24, 2016

(87) PCT Pub. No.: WO2015/133141
PCT Pub. Date: Sep. 11, 2015

(65) Prior Publication Data
US 2017/0017851 A1    Jan. 19, 2017

(30) Foreign Application Priority Data

Mar. 6, 2014 (JP) .................. 2014-044247

(51) Int. Cl.
*G06K 9/00* (2006.01)
*G06F 3/14* (2006.01)
(Continued)

(52) U.S. Cl.
CPC ......... *G06K 9/00845* (2013.01); *B60W 40/08* (2013.01); *G01C 21/36* (2013.01);
(Continued)

(58) Field of Classification Search
CPC ........... G06K 9/00845; G06K 9/00281; G06K 9/00604; G06K 9/00818; B60W 40/08;
(Continued)

(56) References Cited

U.S. PATENT DOCUMENTS

2004/0150514 A1*  8/2004  Newman ................ B60Q 9/008
340/435

FOREIGN PATENT DOCUMENTS

| JP | H06251287 A | 9/1994 |
| JP | 2007078632 A | 3/2007 |
| JP | 2009110394 A | 5/2009 |

* cited by examiner

*Primary Examiner* — Thai Q Tran
*Assistant Examiner* — Christopher Braniff
(74) *Attorney, Agent, or Firm* — Harness, Dickey & Pierce, P.L.C.

(57) ABSTRACT

In a display-object information displaying apparatus, each display object predetermined as a detection target is detected from image data captured by a front capture apparatus to capture of the front of a vehicle. A recognition failure probability that the driver fails to recognize each display object is evaluated. A memory saves the recognition failure probability and display object data containing display-object information with respect to each display object. A display unit displays the display-object information based on the corresponding display object data saved in the memory with respect to each display object. The display-object information about the display object assigned the higher recognition failure probability is displayed preferentially among the display objects corresponding to the display object data saved in the memory.

20 Claims, 6 Drawing Sheets

(51) Int. Cl.
  *G08G 1/0962* (2006.01)
  *G01C 21/36* (2006.01)
  *G06F 3/0488* (2013.01)
  *G06F 3/00* (2006.01)
  *G06F 3/01* (2006.01)
  *G06F 3/0482* (2013.01)
  *B60W 40/08* (2012.01)
  *H04N 7/18* (2006.01)

(52) U.S. Cl.
  CPC ......... *G01C 21/3697* (2013.01); *G06F 3/005* (2013.01); *G06F 3/017* (2013.01); *G06F 3/0482* (2013.01); *G06F 3/0488* (2013.01); *G06F 3/14* (2013.01); *G06K 9/00281* (2013.01); *G06K 9/00604* (2013.01); *G06K 9/00818* (2013.01); *G08G 1/09623* (2013.01); *H04N 7/183* (2013.01)

(58) Field of Classification Search
  CPC ..... G01C 21/36; G01C 21/3697; G06F 3/005; G06F 3/017; G06F 3/0482; G06F 3/0488; G06F 3/14; G08G 1/09623
  See application file for complete search history.

| DISPLAY OBJECT ID | IMAGE DATA | TYPE | DETECT TIME | DETECT POINT | INSTALL POINT | DRIVE LOAD | RECOGNITION FAILURE DEGREE |
|---|---|---|---|---|---|---|---|
| 6 | DISPLAY OBJECT IMAGE F | DIRECTIONAL SIGN | T6 | P16 | P26 | HIGH | 5 |
| 5 | DISPLAY OBJECT IMAGE E | DIRECTIONAL SIGN | T5 | P15 | P25 | MEDIUM | 2 |
| 4 | DISPLAY OBJECT IMAGE D | REGULATION SPEED SIGN | T4 | P14 | P24 | MEDIUM | 3 |
| 3 | DISPLAY OBJECT IMAGE C | DIRECTIONAL SIGN | T3 | P13 | P23 | LOW | 4 |
| 2 | DISPLAY OBJECT IMAGE B | REGULATION NOTICE SIGN | T2 | P12 | P22 | LOW | 1 |

FIG. 4

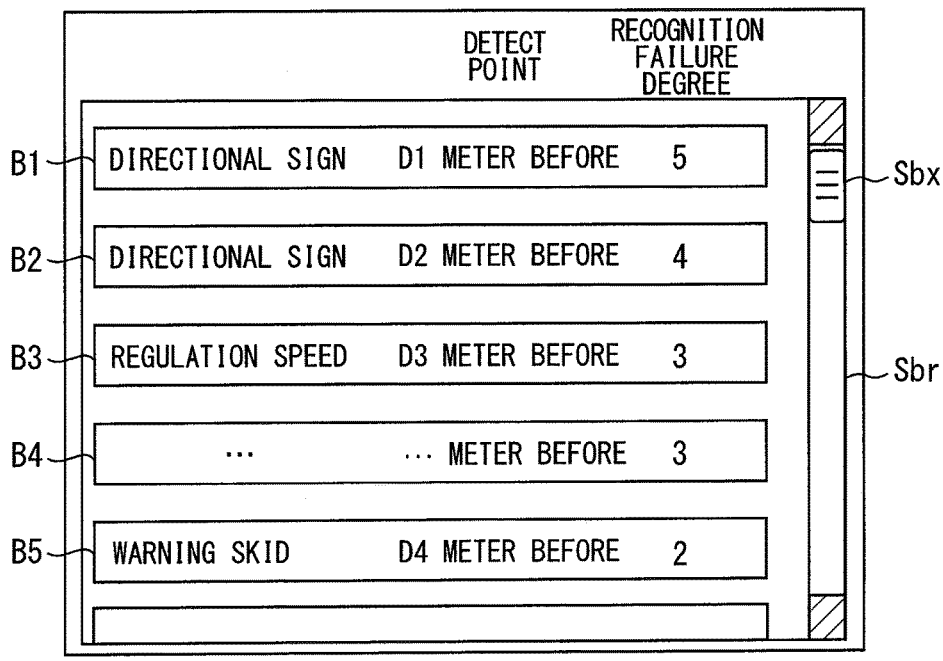

DISPLAY-OBJECT INFORMATION DISPLAYING APPARATUS

CROSS REFERENCE TO RELATED APPLICATIONS

This application is a U.S. National Phase Application under 35 U.S.C. 371 of International Application No. PCT/JP2015/001159 filed on Mar. 5, 2015 and published in Japanese as WO 2015/133141 A1 on Sep. 11, 2015. This present application is based on and claims the benefit of priority from Japanese Patent Application No. 2014-044247 filed on Mar. 6, 2014. The entire disclosures of all of the above applications are incorporated herein by reference.

TECHNICAL FIELD

The present disclosure relates to a display-object information displaying apparatus that allows a display unit to display information about various display objects placed on a road.

BACKGROUND ART

According to a related art, patent literature 1 discloses a display-object information displaying apparatus as an apparatus (i.e., display-object information displaying apparatus) that allows a display unit to display information about a display object such as a signboard installed on (or along) a road where a vehicle mounted with the apparatus travels.

The display-object information displaying apparatus according to patent literature 1 uses a camera to capture the vicinity of a traveling vehicle and uses a publicly known image recognition technology to determine whether the image data contains a predetermined detection target such as a price signboard at a gas station. When the image data contains a detection target, the apparatus extracts information such as a price indicated on the display object as the detection target and stores the image data associated with a facility that installs the display object. The technology described in patent literature 1 allows a driver to retrieve or specify a facility as a destination using the stored information that is extracted from display objects. The information acquired from display objects is used as a condition to retrieve facilities or is displayed on a retrieval screen used to retrieve a facility as a destination.

PRIOR ART LITERATURES

Patent Literature

Patent Literature 1: JP 2007-078632 A

SUMMARY OF INVENTION

Patent literature 1 discloses the technology that displays information acquired from a display object on the road when a destination is retrieved or specified. However, patent literature 1 has no mention of displaying information acquired from a display object on the road at the time except when a destination is retrieved or specified.

A road is equipped with various display objects such as a directional sign to indicate the destination of a road connected to a crossing and a regulatory sign to indicate the upper limit of a travel speed. A driver can view the display objects to recognize a route to the destination or information about safer driving.

However, the driver may have difficulty visually recognizing all the display objects while driving as an important task. For example, suppose the driver fails to recognize a directional sign. The driver cannot determine which road to choose at the crossing guided by the directional sign.

A solution is to store information about display objects on the road while driving and display the information about the display object in response to a specified manipulation. This enables the driver to later recognize the information about the display object the driver failed to recognize.

However, displaying the information about all the display objects acquired from the road causes the driver to have difficulty in finding information about a necessary display object from among all the information about many display objects. In addition, the driver himself or herself may not be aware of what display object the driver failed to recognize. This increases difficulty in finding information about the display object the driver failed to recognize from among all the information about many display objects.

It is an object of the present disclosure to provide a display-object information displaying apparatus that displays information about a display object a driver may have failed to recognize so that the driver can easily recognize the display object.

To achieve the object, according to an example of the present disclosure, a display-object information displaying apparatus is provided to include the following. A display object detection section detects display objects each predetermined as a detection target, from image data captured by a front capture apparatus to capture a front of a vehicle. A recognition failure evaluation section evaluates a recognition failure probability about each of the display objects detected by the display object detection section; the recognition failure probability is a probability that a driver of the vehicle fails to recognize each of the display objects. A save section causes a memory to save display object data corresponding to each of the display objects, the display object data containing display-object information presented by each of the display objects detected by the display object detection section and the recognition failure probability evaluated with respect to each of the display objects by the recognition failure evaluation section. A drawing section causes a display unit to display the display-object information about each of the display objects based on the display object data that corresponds to each of the display objects and is saved in the memory. Herein, the drawing section causes the display unit to display the display-object information about the display object assigned a higher recognition failure probability preferentially among the display objects corresponding to the display object data saved in the memory.

According to the above configuration, the drawing section allows the display unit to preferentially display display-object information about a display object evaluated by the recognition failure evaluation section to indicate that the driver is highly likely to fail to recognize the display object. The display unit preferentially displays the information the driver is highly likely to fail to recognize.

The driver can view the preferentially displayed display-object information and thereby recognize the contents of a display object the driver is likely to fail to recognize.

BRIEF DESCRIPTION OF DRAWINGS

The above and other objects, features and advantages of the present disclosure will become more apparent from the following detailed description made with reference to the accompanying drawings. In the drawings:

FIG. 3 is a conceptual diagram exemplarily illustrating a data configuration of a display object data list;

FIG. 4 is a diagram of exemplarily illustrating a display object list image generated by a list display section;

EMBODIMENTS FOR CARRYING OUT INVENTION

Figure 1:
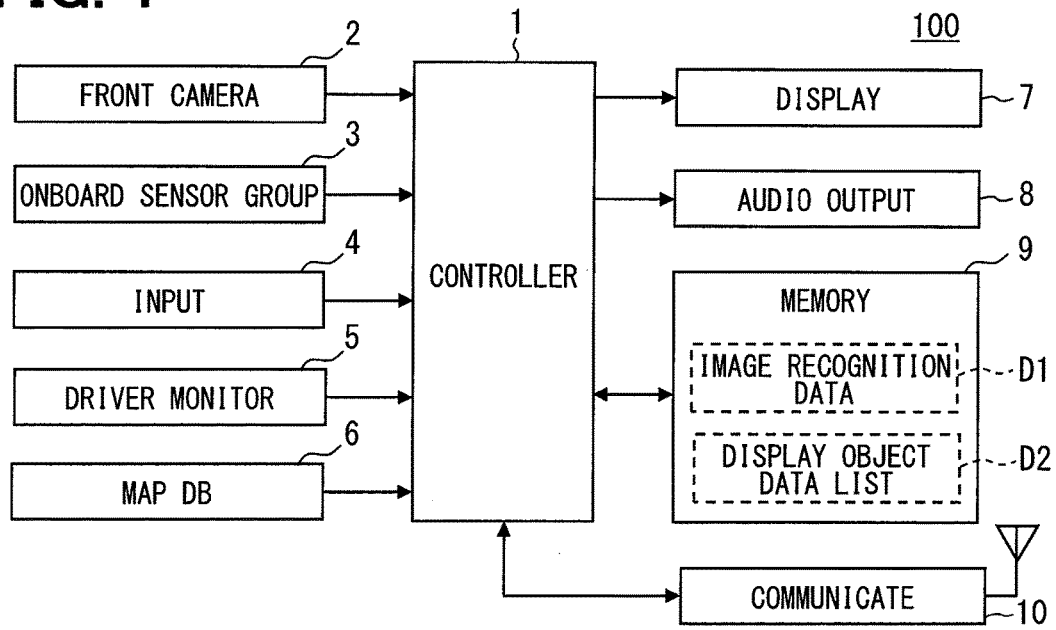
FIG. 1 is a block diagram exemplarily illustrating a schematic configuration of a driving support system according to an embodiment.

Embodiments of the present invention will be described in further detail with reference to the accompanying drawings. FIG. 1 exemplarily illustrates a schematic configuration of a display-object information display system 100 according to the embodiment. As in FIG. 1, the display-object information display system 100 includes a controller 1, a front camera 2, an onboard sensor group 3, an input apparatus 4, a driver monitor 5, a map database (hereinafter referred to as a map DB) 6, a display unit 7, an audio output apparatus 8, a memory 9, and a communication apparatus 10. The controller 1, the front camera 2, the onboard sensor group 3, the input apparatus 4, the driver monitor 5, the map DB 6, the display unit 7, the audio output apparatus 8, the memory 9, and the communication apparatus 10 intercommunicate with each other via a known intra-vehicle network. A vehicle mounted with the display-object information display system 100 is hereinafter also referred to as a host vehicle. The "display object" is also referred to as a signboard.

The front camera 2 is provided near an inside rear view mirror in a vehicle compartment in order to capture a specified range (hereinafter referred to as a forward capture range) ahead of the host vehicle. The front camera 2 captures the forward capture range successively (e.g., every 100 msec). The forward range is applicable diagonally to the front of the host vehicle as well as straight in front of the same. The front camera 2 successively captures a road and other vehicles on the road in the forward capture range. The controller 1 is successively supplied with image data that is captured and generated by the front camera 2.

The front camera 2 according to the embodiment is provided as an optical camera available as a CMOS camera or a CCD camera. The front camera 2 may be also provided as an infrared camera. The front camera 2 just needs to be able to detect a display object on (or along) the road. The front camera 2 may be provided not only near the inside rear view mirror but also outside the vehicle compartment of the host vehicle (e.g., at the center of a front bumper). The front camera 2 is also referred to as a front capture apparatus.

The onboard sensor group 3 applies to various sensors to detect host vehicle states and includes a vehicle speed sensor, an acceleration sensor, a gyro sensor, a GNSS receiver, a steering angle sensor, a brake pedal sensor, an accelerator pedal sensor, and a turn signal lever position sensor, for example.

The vehicle speed sensor detects a travel speed of the host vehicle. The acceleration sensor detects an acceleration acting on the host vehicle. The GNSS receiver receives a radio wave from a satellite used for GNSS (Global Navigation Satellite System) and thereby acquires data indicating a current position of the GNSS receiver. The GNSS receiver may be available as a GPS receiver, for example.

The gyro sensor detects an angular velocity of rotation around a vertical axis of the host vehicle. The steering angle sensor detects a steering angle based on a steering wheel angle. The brake pedal sensor detects the amount of brake pedal manipulation. The accelerator pedal sensor detects the amount of accelerator pedal manipulation. The turn signal lever position sensor detects whether the turn signal lever is positioned to turn left or right. Detection values detected by various sensors included in the onboard sensor group 3 are successively output to the controller 1.

The input apparatus 4 is available as a touch panel integrated with a display panel provided for the display unit 7. The driver manipulates the input apparatus 4 and thereby instructs the controller 1 to perform various functions. For example, the driver can manipulate the input apparatus 4 and thereby instruct the controller 1 to display a display object list image to be described later. The input apparatus 4 outputs a control signal to the controller 1. The control signal corresponds to the driver's manipulation on the input apparatus 4.

The input apparatus 4 according to the embodiment is provided as a touch panel. However, the input apparatus 4 is not limited to the touch panel and may be also provided as a mechanical switch or a speech recognition apparatus that enables the driver's speech to input an instruction. Obviously, the input apparatus 4 may be embodied as any combination of these.

The driver monitor 5 is installed in a vehicle compartment so that a capture plane is oriented to the driver. The driver monitor 5 captures a range including the driver's face successively (e.g., every 100 milliseconds). The driver monitor 5 successively outputs image data for a captured image to the controller 1. The driver monitor 5 according to the embodiment is attached to a steering column cover but may be attached to a rear view mirror according to other modes.

The driver monitor 5 according to the embodiment uses an infrared camera that detects infrared rays to enable capturing under low visible light conditions. Obviously, the driver monitor 5 is not limited to an infrared camera but may use an optical camera such as a CMOS camera or a CCD camera that senses visible light. The driver monitor 5 is also referred to as a face capture apparatus.

The map DB 6 is provided as a database that stores map data and uses a writable nonvolatile storage medium such as HDD (Hard Disk Drive), for example. The storage medium to store map data for the map DB 6 is not limited to a magnetic storage medium such as HDD but may use an optical storage medium such as DVD. The storage medium may be unwritable. The map data contains road data that represents connection relation (i.e., a road network) among roads.

The road data contains node data and link data. The node data relates to a point (node) where several roads intersect, join, or branch. The link data relates to a road (link) that connects one point with another. The node data contains a node ID assigned a number unique to each node, node coordinates (latitude and longitude), a node name, a connection link ID describing link IDs of all the links connected to the node, and data indicating whether a traffic light is installed.

The link data contains a link ID assigned a number unique to each road, a link length, a start-point node and an end-point node of the link, coordinate data for each point on the link, road types such as an expressway and an ordinary road, a road width, a link orientation, a road name, the number of lanes, and a regulation speed.

The display unit 7 displays text or an image based on an instruction from the controller 1 and notifies the driver of various informations. The display unit 7 is capable of full-color display and may use a liquid crystal display, an organic EL display, or a plasma display. The display unit 7 according to the embodiment functions as a center display that is placed near the center of an instrument panel with reference to the vehicle width direction. The present application uses "information" as a countable noun as well as an uncountable noun.

According to other modes, the display unit 7 may be provided as a meter display placed above the instrument panel toward a driver's seat. The display unit 7 may be provided as a known head-up display that projects a virtual image on part of a windshield ahead of the driver's seat to display various informations. The display unit 7 may be embodied as a combination of the center display, the meter display, and the head-up display. When the display unit 7 uses several displays, the controller 1 selects a display as an output destination of data to be displayed on that display.

The audio output apparatus 8 includes a speaker and converts speech data supplied from the controller 1 into a speech (including a sound) for output.

The memory 9 includes a writable and nonvolatile storage medium and an apparatus to read and write data to the storage medium. The memory 9 may use a known storage medium such as a magnetic disk, an optical disk, or a flash memory. The memory 9 according to the embodiment uses a removable storage medium such as an SD card. Obviously, the storage medium is available as DVD, CD, or HDD. The memory 9 stores image recognition data D1 and display object data list D2 to be described later.

The communication apparatus 10 includes a transmitting and receiving antenna. The communication apparatus 10 communicates with an externally installed information collection server (unshown) via a communication network such as a phone line or the Internet. As an example, the communication apparatus 10 is embodied as a communication module used for a known third-generation mobile communication system. The communication apparatus 10 may use various onboard communication modules including DCM (Data Communication Module). The communication apparatus 10 may communicate with the information collection server via a roadside unit installed at a crossing.

The controller 1 is also referred to as a control circuit. For example, the controller 1 according to the embodiment is configured as an ordinary computer that includes: a known CPU; nonvolatile memory such as ROM, EEPROM, or flash memory; volatile memory such as RAM; I/O; and a bus line to connect these components though none of these are illustrated. The nonvolatile memory stores a program module and data to perform various processes.

Figure 2:
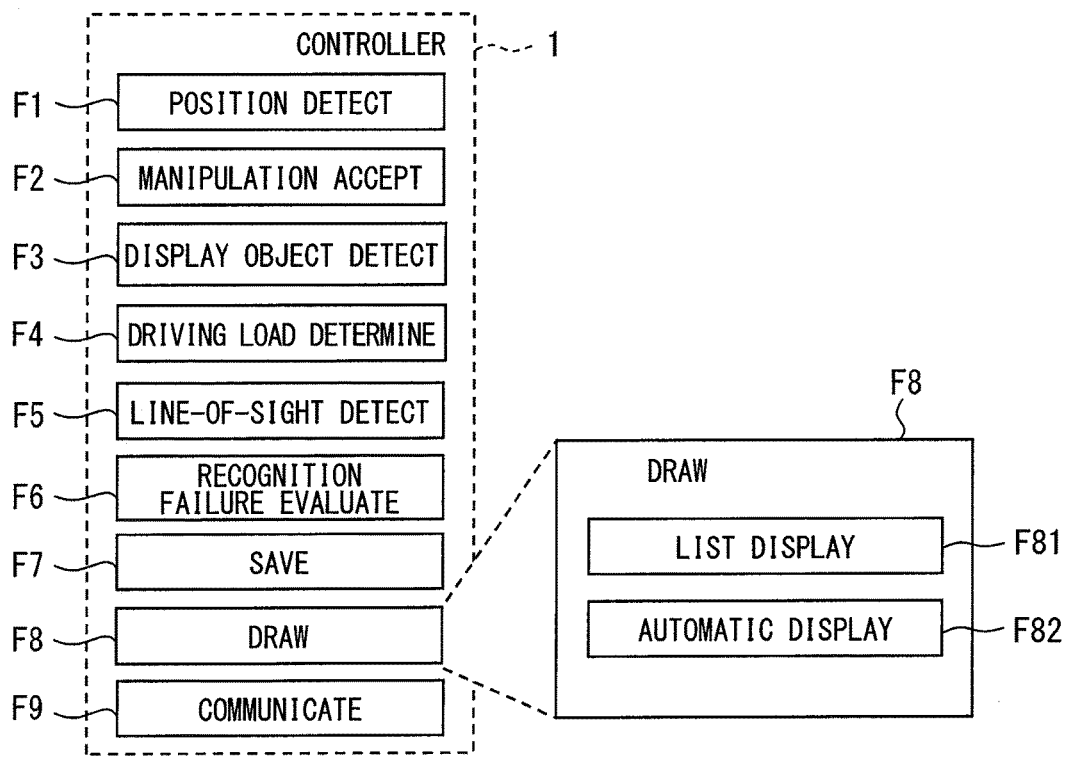
FIG. 2 is a block diagram exemplarily illustrating a schematic configuration of a controller according to the embodiment.

With reference to FIG. 2, the description below explains functions the controller 1 provides by performing various program modules stored in the nonvolatile memory. As in FIG. 2, the controller 1 includes function blocks such as a position detection section F1, a manipulation acceptance section F2, a display object detection section F3, a driving load determination section F4, a line-of-sight detection section F5, a recognition failure evaluation section F6, a save section F7 (also referred to as a save processor), a drawing section F8 (also referred to as a display controller), and a communication section F9 (also referred to as a communication processor). The controller 1 having these functions is also referred to as a display-object information displaying apparatus. All or part of the function blocks or the sections may be provided as hardware components.

The position detection section F1 detects a current position of the host vehicle based on signals supplied from the GNSS receiver and sensors such as the vehicle speed sensor and a gyroscope included in the onboard sensor group 3. Position information indicating the current position can be represented in latitude and longitude, for example. The position detection section F1 acquires the position information about the host vehicle successively (e.g., every 100 milliseconds). The position detection section F1 is also referred to as a position acquisition section.

The sensors to detect a current position each have a specific error. The sensors are used to complement each other. Obviously, the position detection section F1 may use output values from some of the sensors depending on the accuracy of each sensor.

The manipulation acceptance section F2 accepts a process corresponding to the driver's manipulation on the input apparatus 4 from a control signal supplied from the input apparatus 4. For example, the manipulation acceptance section F2 accepts a process to display a display object list image based on the driver's manipulation. Processes accepted by the manipulation acceptance section F2 are queued and are performed successively.

The display object detection section F3 detects a display object predetermined as a detection target by performing a known image recognition process on image data successively supplied from the front camera 2. The image recognition process may use a publicly known method such as pattern matching or the Hough transform.

More specifically, the display object detection section F3 performs a known image process such as edge detection on image data acquired from the front camera 2 and extracts contours of all objects contained in the image. The display object detection section F3 performs a pattern matching process on the image-processed image data and thereby detects a display object as the detection target. The image process is not limited to the edge detection but may also include the mirror image conversion to convert image data into a mirror image or the distortion correction to correct a distortion occurring around an image due to lens characteristics.

According to the embodiment, the display object predetermined as a detection target is provided as a road sign including an information sign, a danger warning sign, a regulatory sign, an indication sign, and an auxiliary sign. The information sign includes a route guidance sign (i.e., a route information sign) such as a directional sign and a point information sign indicating a point name, a road name, and a road number. The danger warning sign prompts the driver to carefully drive the vehicle with attention to strong wind, rockfall, or skid. The regulatory sign includes a no-entry sign to inhibit entry into a road equipped with the sign, a traveling direction regulation sign to indicate the traveling direction of each lane, and a regulation speed sign to indicate the regulation speed.

The indication sign indicates a pedestrian crossing, a stop line, or a preference road. The auxiliary sign is used with the information sign, the danger warning sign, the regulatory sign, or the indication sign. The auxiliary sign provides additional information for a sign (e.g., regulatory sign) installed near the auxiliary sign.

A detection target is not limited to a display object whose display content remains unchanged. For example, the detection target may represent an electronic message board whose display content varies dynamically. The detection target includes an electronic message board that notifies road information such as a regulation speed, accident occurrence, and a toll on expressways. The detection target according to the embodiment represents a road sign but is not limited thereto. The detection target may represent a price signboard at a gas station.

The memory 9 stores data (image recognition data) D1 is used for the image recognition process that detects display objects as the detection targets from image data. For example, the memory 9 stores the image recognition data that indicates a shape pattern of each detection target. Each shape pattern data contains a display object type that represents the content indicated by the detection target. For example, shape pattern data to detect a regulation speed sign contains a regulation speed sign as the display object type. The display object detection section F3 can acquire the display object type of a display object detected as the detection target.

Image recognition data D1 also contains data representing shape patterns of characters that conform to Japanese systems of syllabic writing and alphabetization. Image recognition data D1 enables the display object detection section F3 to acquire text displayed on an electronic message board or a character string contained in a road sign.

The display object detection section F3 notifies the recognition failure evaluation section F6 or the save section F7 that a display object as the detection target is detected in image data. The display object detection section F3 attaches a display object ID to the detected display object as the detection target. The display object ID may use a number assigned in the order of detection targets detected or may use the time when the display object is detected.

The display object detection section F3 detects a display object as the detection target in the image data, extracts the display object from the image data, and outputs the display object to the save section F7. An image for the display object extracted by the display object detection section F3 is referred to as a display object image. The display object detection section F3 outputs the display object image along with the display object ID and the display object type to the save section F7.

Suppose the display object detection section F3 detects a display object as the detection target in the image data. The display object detection section F3 then detects a position of the display object in relation to the host vehicle based on the position of the display object in the image data, the position of the front camera installed in the host vehicle, and the capture direction. The position of the display object in relation to the host vehicle is hereinafter referred to as a relative display object position. The display object detection section F3 keeps track of the display object, once detected, using a known object tracking technique and successively updates the relative display object position. The display object detection section F3 successively outputs the relative display object position along with the display object ID given to the display object to the recognition failure evaluation section F6 to be described later.

The driving load determination section F4 determines a driving load level representing the magnitude of driving load on the driver based on sensor values supplied from various sensors that are included in the onboard sensor group 3 and indicate travel states of the host vehicle.

The driving load determination section F4 determines a driving load level using parameters such as a vehicle speed detected by the vehicle speed sensor, an acceleration output from the acceleration sensor, a steering angle detected by the steering angle sensor, a yaw rate detected by a yaw rate sensor, and a turn signal lever position detected by the turn signal lever position sensor.

For example, the driving load determination section F4 determines that increasing the vehicle speed, the acceleration, the steering angle, or the yaw rate increases the driving load level. The driving load determination section F4 also determines that positioning the turn signal lever to turn right or left increases the driving load. Positioning the turn signal lever to turn right or left signifies that the driver intends to turn right or left at a crossing or to change the lane. In such a case, the driver needs to more carefully confirm the safety nearby, relatively increasing the driving load on the driver.

The driving load determination section F4 may specify a road type or a road shape of the road currently traveled by the host vehicle based on the position information detected by the position detection section F1 and map data stored in the map DB 6 and determine the driving load level based on the specified road type or road shape. For example, the driving load determination section F4 determines the driving load level applicable to the host vehicle traveling an expressway road to be higher than that applicable to the host vehicle traveling an ordinary. The driving load determination section F4 also determines the driving load level applicable to the host vehicle traveling a tight curve to be higher than that applicable to the host vehicle traveling a straight road.

The driving load determination section F4 according to the embodiment represents the driver's driving load level in three grades, namely, high, medium, and low, for example. Any design is applicable to a condition for the driving load determination section that uses the above parameters F4 to determine to which of the three levels the current driving load level corresponds.

The driving load determination section F4 determines an element load level for each of the parameters such as the vehicle speed, the acceleration, the steering angle, and the yaw rate and determines the driving load level based on an element level of each parameter. The element load level represents a condition for each parameter and is used to determine the driving load level.

Similarly to the driving load level, the element load level is represented in three grades, high, medium, and low. A higher element load level corresponds to a higher driving load level. Each parameter is previously given a first threshold value and a second threshold value. The first threshold value determines that the element load level of the parameter is medium. The second threshold value determines that the driving load level of the parameter is high.

For example, suppose the vehicle speed is given the first threshold value set to 40 km/h and the second threshold value set to 80 km/h. The element load level of the vehicle speed is determined to be high when the current vehicle speed is larger than or equal to the second threshold value. The element load level of the vehicle speed is determined to be medium when the current vehicle speed is smaller than the second threshold value and is larger than or equal to the first threshold value. The element load level of the vehicle speed is determined to be low when the current vehicle speed is smaller than the first threshold value. Similarly, the first threshold value and the second threshold value are given to the other parameters to determine the element load level for each parameter.

The driving load level is determined to be high when at least one of all the parameters is given the high element load level. The driving load level is determined to be medium when no parameter is given the high element load level and the number of parameters given the medium element load level is larger than or equal to the specified number (e.g., two). The driving load level is determined to be low when no parameter is given the high element load level and the number of parameters given the medium element load level is smaller than the specified number (e.g., two).

The driving load level is determined to be higher by one level when the turn signal lever is positioned to turn right or left. The high level remains unchanged when the driving load level is already set to be high.

The line-of-sight detection section F5 successively acquires image data captured by the driver monitor 5, detects feature points from the image data using a known image processing technique, and detects a face area, an eye area in the face area, and a pupil portion. The driver monitor 5 according to the embodiment is installed at a fixed point and uses a fixed direction for capturing. The line-of-sight detection section F5 can specify a position of the driver's face in the vehicle according to the position or the size of the face area in the image data. The line-of-sight detection section F5 computes the driver's face orientation and eye direction based on the size of the face area and positions of the eye area and the pupil in the face area. The line-of-sight detection section F5 is also referred to as an eye direction detection section.

The recognition failure evaluation section F6 computes a degree of the driver's probability of failing to recognize a display object detected by the display object detection section F3 based on the driving load level determined by the driving load determination section F4, the relative display object position of the display object, and the driver's eye direction detected by the line-of-sight detection section F5. In the description below, a recognition failure degree signifies the degree of the driver's probability of failing to recognize a display object detected by the display object detection section F3. The recognition failure degree is also referred to as a recognition failure probability.

The recognition failure evaluation section F6 according to the embodiment represents the recognition failure degree using five grades corresponding to five values 1 through 5 as in a procedure below as an example. A larger value given to the recognition failure degree signifies a higher probability that the driver fails to recognize the display object.

The recognition failure evaluation section F6 determines a primary recognition failure degree based on the driver's eye direction and the relative display object position. The recognition failure evaluation section F6 corrects the primary recognition failure degree in accordance with the driving load level to determine a final recognition failure degree for the display object. Similarly to the recognition failure degree, the primary recognition failure degree also represents a degree of the driver's probability of failing to recognize a display object detected by the display object detection section F3. A larger value signifies a higher probability that the driver fails to recognize the display object.

More specifically, the recognition failure evaluation section F6 determines whether the driver's eye direction continuously conforms to a direction (display object direction) enabling the driver to recognize a display object as long as a first determination time (e.g., 0.5 seconds) or longer after the display object is detected until the host vehicle passes through the display object. The display object direction may be computed from the relative display object position successively computed by the display object detection section F3 for the display object and the driver's head position successively detected by the line-of-sight detection section F5 in the vehicle.

The driver is highly probable to recognize the contents of the display object when the driver's eye direction conforms to the display object direction for the first determination time (e.g., 0.5 seconds) or longer after the display object is detected until the host vehicle passes through the display object. The primary recognition failure degree is rated 1 signifying the lowest probability of recognition failure.

Suppose the driver's eye direction is detected to continuously conform to the display object direction but for the duration shorter than the first determination time (e.g., 0.5 seconds). In this case, the primary recognition failure degree is rated 2. Suppose the driver's eye direction differs from the display object direction but the driver's eye direction and the display object direction continue to form a specified angle (e.g., 30 degrees) or smaller for a second determination time (e.g., 1.5 seconds) or longer. In this case, the primary recognition failure degree is rated 3. In the other cases, the primary recognition failure degree is rated 4.

The recognition failure evaluation section F6 determines the final recognition failure degree by performing correction appropriate to the driving load level so that the recognition failure degree increases as the driving load level increases in relation to the primary recognition failure degrees as found above. The driving load level to be used is the highest one out of driving load levels that are determined after the display object is detected until the host vehicle passes through the display object. The recognition failure evaluation section F6 performs correction by assuming the driving load level to be high when the driving load level is determined to be high at least once after the display object is detected until the host vehicle passes through the display object. Any design is applicable to a method of determining the driving load level used to rate the recognition failure degree.

The recognition failure degree is determined by adding the primary recognition failure degree and a correction value dependent on the driving load level. More specifically, the recognition failure degree is found by adding 1 to the primary recognition failure degree when the driving load level is high. For example, suppose the primary recognition failure degree is rated 4 and the driving load level is high. The recognition failure evaluation section F6 then rates the recognition failure degree as 5. The recognition failure degree is found by adding 0 to the primary recognition failure degree when the driving load level is low or medium. Namely, the value of the primary recognition failure degree is directly used as the recognition failure degree.

As another mode, the recognition failure degree may be determined by multiplying the primary recognition failure degree by a correction value dependent on the driving load level. In this case, the correction value is also specified so that increasing the driving load level increases the recognition failure degree.

As above, the recognition failure evaluation section F6 evaluates the primary recognition failure degree from the driver's eye direction and the display object direction, applies the correction appropriate for the driving load level to the primary recognition failure degree, and determines the recognition failure degree. However, the configuration is not limited thereto. The recognition failure evaluation section F6 may first evaluate a temporary recognition failure degree (i.e., the primary recognition failure degree) according to the driving load level, apply the correction to the result using the driver's eye direction and the display object direction, and determine the final recognition failure degree.

The recognition failure evaluation section F6 may evaluate the recognition failure degree to be high in proportion to an increase in the driving load level or a decrease in the time during which the display object remains in the driver's visibility, after the display object is detected until the host vehicle passes through the display object.

The embodiment uses the driving load level and the driver's eye direction to compute the recognition failure probability. However, the configuration is not limited thereto. The recognition failure probability may be computed in response to the driving load level without the use of the driver's eye direction. In this case, the recognition failure probability is computed to be high in proportion to an increase in the driving load level. Further, the recognition failure probability may be computed based on the relative display object position of the display object and the driver's eye direction without the use of the driving load level. This mode performs no correction appropriate to the driving load level according to the configuration of the embodiment.

The degree represents the probability that the driver fails to recognize a display object detected by the display object detection section F3. However, the configuration is not limited thereto. As another mode, percentages may represent the probability that the driver fails to recognize a display object detected by the display object detection section F3.

The save section F7 saves data (display object data) concerning a display object detected by the display object detection section F3 in the memory 9. The display object data contains the display object ID, the display object image, the display object type, the time to detect the display object, the position information about a point (detection point) to detect the display object, and the position information about a point (installation point) to install the display object. The information about a display object also contains the driving load level valid during detection (and tracking) of the display object and the recognition failure degree rated for the display object by the recognition failure evaluation section F6.

Position information about the detection point uses the current position of the host vehicle corresponding to the time to detect the display object. The current position of the host vehicle corresponding to the time to detect the display object is not limited to the current position of the host vehicle the position detection section F1 acquires at the time to detect the display object. The current position thereof includes the current position of the host vehicle the position detection section F1 acquires before and after the time to detect the display object. The position information about the point to install the display object can be computed from the position information about the point to detect the display object and the relative display object position.

As above, the driving load level uses the highest driving load level determined by the driving load determination section F4 after the display object is detected until the host vehicle passes through the display object. As another mode, the driving load level to be used may be applicable at the time to detect the display object. The driving load level may be an average value or a median value of driving load levels that are determined after the display object is detected until the host vehicle passes through the display object. In addition, chronological data may be saved to chronologically provide driving load levels the driving load determination section F4 determines after the display object is detected until the host vehicle passes through the display object.

When the display object ID and the display object image are input from the display object detection section F3, the save section F7 according to the embodiment generates display object data corresponding to the display object and additionally saves the display object data in the display object data list D2. The display object data list D2 provides display object data in a list structure corresponding to each of display objects detected by the display object detection section F3. The display object ID attached to the display object data enables the controller 1 to reference the display object data corresponding to the display object ID. FIG. 3 exemplarily illustrates a data configuration of the display object data list D2 saved in the memory 9.

As in FIG. 3, the display object data list D2 saves display object images B through F each associated with the time to detect the display object, the position information about the point to detect the display object, the position information about the point to install the display object, the driving load level, and the recognition failure degree rated by the recognition failure evaluation section F6 for the display object.

The save section F7 adds display object data to the beginning of the display object data list. Display object data in the display object data list are arranged in descending order of detection times from the newly added data. Therefore, the most recent display object data is placed atop (at the beginning) in the display object data list saved in the memory 9. Any design is applicable to the order of display object data in the display object data list D2 (e.g., see a second modification).

In FIG. 3, for example, a display object assigned display object ID 6 is associated with display object image F as the display object image and a directional sign as the display object type. A storage area to actually save display object images differs from the storage area to save the list. A column in the display object data is used for the display object image and stores an address of the storage area to save display object image F. The display object assigned display object ID 6 is associated with time T6 as the detection time, P16 as the detection point, and P26 as the installation point. The driving load level remains high while the display object is detected. The recognition failure evaluation section F6 rates the recognition failure degree as 5.

The other display object data assigned display object IDs 5 through 2 are associated with various data similarly to the display object data assigned display object ID 6. The driving load level remains medium during detection of the display objects assigned display object IDs 5 and 4. The display objects are associated with different recognition failure degrees because the driver's eye direction causes different primary recognition failure degrees.

The drawing section F8 generates image data to be displayed on the display unit 7 and outputs the generated image data to the display unit 7 for display. As in FIG. 2, the drawing section F8 includes subdivided function blocks, namely, a list display section F81 (also referred to as a list display processor) and an automatic display section F82 (also referred to as an automatic display processor).

The manipulation acceptance section F2 accepts the driver's manipulation to display an image (display object list image) that represents a list of display objects detected by the display object detection section F3. In this case, the list display section F81 generates a display object list image from the display object data list D2 and displays the display object list image on the display unit 7. The display object list image provides information about display objects registered to the display object data list D2 in descending order of the recognition failure degrees. A list displayed as the display object list image is hereinafter referred to as a display object list. The embodiment deals with the display object list displayed on the display unit 7 differently from the display object data list D2 stored in the memory 9.

FIG. 4 illustrates an example of the display object list image. A list displayed in the display object list image in FIG. 4 includes button images (hereinafter referred to as buttons) B1 through B5 corresponding to display objects registered to the display object data list D2. Each button displays information about the display object corresponding to the button. The driver can view the information on the button to recognize the information about the display object corresponding to the button.

The buttons B1 through B5 can accept the driver's touch manipulation. The driver can select (or touch) any of the buttons B1 through B5 to display a display object image corresponding to the display object. The buttons B1 through B5 accept the driver's manipulation to display a display object image corresponding to the display object. The driver can notice more detailed information about the display object by displaying the display object image.

Each of the buttons B1 through B5 contains text information representing the display object type, the detection point, and the recognition failure degree of the display object as information about the display object corresponding to the button. The item for the detection point represents a distance from the current position instead of coordinates for the detection point. For example, the item for the detection point corresponding to the button B1 indicates that the display object is installed at a point the host vehicle passes through D1 meters before the current position. A distance between the current position and the installation point of the display object can be computed from the installation point registered to the display object data list D2, the current position of the host vehicle acquired by the position detection section F1, and the map data. Another mode may display information such as the name of a road where the display object is detected. The name of a road where the display object is detected can be acquired by referencing the map data based on the position information about the detection point.

The item for the recognition failure degree directly displays the recognition failure degree registered to the display object data list D2. The item may be converted into a percentage based on the recognition failure degree registered to the display object data list D2.

The recognition failure degree of the display object may be represented by changing the display mode of buttons in response to the recognition failure degree. For example, the buttons may be colored in red, orange, yellow, green, and yellowish green in ascending order of recognition failure degrees. The button corresponding to a display object with the highest recognition failure degree may be highlighted by blinking. Basically, the item for the recognition failure degree may be displayed so that the driver can recognize the recognition failure degree of the display object corresponding to the button. Any design is applicable to display modes of the buttons and information displayed for the buttons.

The list display section F81 sequentially displays the display object list in descending order (i.e., from the beginning of the list). The display object list is displayed in descending order of the recognition failure degrees because the list shows display objects detected by the display object detection section F3 in descending order of the recognition failure degrees.

The display unit 7 uses a limited display area. When a display object list image is displayed, a specified value is assigned to the number of buttons (referred to as a displayable count) that correspond to the display object and are displayed on a single screen. The displayable count is also referred to as the number of displayable buttons. The number of display object data contained in the display object data list D2 may be larger than or equal to the displayable count. In such a case, the initially displayed screen does not contain a button corresponding to the display object assigned a relatively low recognition failure degree. That button, if contained in the initially displayed screen, is placed below a button corresponding to the display object assigned a relatively high recognition failure degree. The screen is also referred to as a window.

According to the embodiment, sliding a scroll box Sbx downward on a scroll bar Sbr can display the button corresponding to a display object not appearing in the initial screen that displays the display object list image.

Another mode may generate the display object list image on a screen basis (on a page basis). In this case, the driver manipulation to transition to the next screen enables the driver to display the button corresponding to a display object not appearing in the initial screen.

According to the above configuration, the display unit 7 displays a button corresponding to the display object assigned a higher recognition failure probability in preference to the other buttons. The driver can easily select a button corresponding to the display object assigned a higher recognition failure probability from options displayed in the display object list image because the display unit 7 displays a button corresponding to the display object assigned a higher recognition failure probability in preference to the other buttons.

According to the embodiment, the button images (hereinafter referred to as buttons) B1 through B5 corresponding to display objects registered to the display object data list D2 include the function to accept manipulation to display a display object image for the display object corresponding to the button. However, the configuration is not limited thereto. The button may simply display display-object information (or display-object content information) about the display object corresponding to the button.

The automatic display section F82 automatically displays display-object information on the display unit 7 at a specified time. The display-object information represents the contents of a display object that belongs to the display objects registered to the display object data list D2 and is assigned a recognition failure degree greater than or equal to a specified threshold value (hereinafter referred to as an automatic display threshold value). According to the embodiment, the display-object information to be displayed corresponds to a display object image for the display object. The description below refers to an automatic display process that automatically displays a display object image for the display object whose recognition failure degree is greater than or equal to a specified threshold value.

In the description below, the display unit 7 automatically displays the display object image for a display object assigned recognition failure degree 5 or larger. An automatic display candidate designation process is performed as a preparatory process to perform the automatic display process. Various processes performed by the automatic display section F82 will be described in detail later.

The communication section F9 acquires data received by the communication apparatus 10 and performs a process that outputs data generated by the controller 1 to the communication apparatus 10 so that the data is transmitted.

(Display Object Detection Process)

Using the flowchart in FIG. 5, the description below explains a flow of the process (display object detection process) in which the display object detection section F3 detects a display object as a detection target from image data input from the front camera 2. The flowchart in FIG. 5 starts successively (e.g., every 100 milliseconds), for example.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer. Furthermore, the software section may be included in a software program, which may be contained in a non-transitory computer-readable storage medium as a program product.

At S11, the display object detection section F3 acquires image data from the front camera 2 and proceeds to S11. At S12, the display object detection section F3 performs a known image recognition process on the image data acquired at S11 and determines whether the image data contains a display object as a detection target, namely, a display object corresponding to shape pattern data included in the image recognition data.

The determination at S13 results in YES if the display object detection section F3 detects a display object as a detection target in the image data acquired at S11. The display object detection section F3 proceeds to S14. The determination at S13 results in NO if the display object detection section F3 detects no display object as a detection target in the image data acquired at S11. The display object detection section F3 proceeds to S18.

At S14, the display object detection section F3 determines whether the display object detected at S13 is already detected in a previous process related to display object detection. A newly detected display object can be distinguished from an already detected display object because a tracking process is performed on the already detected display object. An already detected display object can signify a display object already assigned the display object ID. The determination at S14 results in YES if the display object detected at S13 is already detected. The display object detection section F3 proceeds to S19. The determination at S14 results in NO if the display object detected at S13 is not already detected but is newly detected. The display object detection section F3 proceeds to S15.

At S15, the display object detection section F3 assigns a display object ID to the display object and extracts an area corresponding to the display object from the image data acquired at S11 to generate a display object image. The display object detection section F3 specifies a display object type from a shape pattern of the display object. When completing the process at S15, the display object detection section F3 proceeds to S16.

The results of S13 and S14 may indicate that the display object determined as being newly detected corresponds to the type of auxiliary sign. In this case, the display object detection section F3 collectively extracts original signs in the vicinity of the auxiliary sign. The vicinity of the auxiliary sign signifies the inside of a range comparable to 1 m from the auxiliary sign in the real space. The display object detection section F3 also collectively extracts original signs when an auxiliary sign exists in the vicinity of a newly detected original sign.

At S16, the display object detection section F3 uses the position and the size of the display object in the image data acquired at S11 to compute a relative position (relative display object position) of the display object in relation to the host vehicle and then proceeds to S17.

At S17, the display object detection section F3 calls a display object data save process and then terminates the process flow. The display object data save process will be described using a flowchart in FIG. 6. The display object detection section F3 passes parameters to perform the display object data save process to the save section F7. The parameters include the display object ID, the display object image, the relative display object position, and the display object type.

At S18, the display object detection section F3 discards the image data acquired at S11 and then terminates the process flow. At S19, the display object detection section F3 applies a known tracking technology to the detected display object to specify an image area corresponding to the detected display object in the image data acquired at S11. The display object detection section F3 computes a relative display object position of the display object specified by the tracking process, outputs the relative display object position along with the display object ID to the recognition failure evaluation section F6, and then terminates the process flow.

(Display Object Data Save Process)

With reference to a flowchart in FIG. 6, the description below explains a process (display data save process) the save section F7 performs to save display object data for a display object detected by the display object detection section F3 in the memory 9. The flowchart in FIG. 6 starts when control is passed to S17 of the flowchart in FIG. 5.

Figure 5:
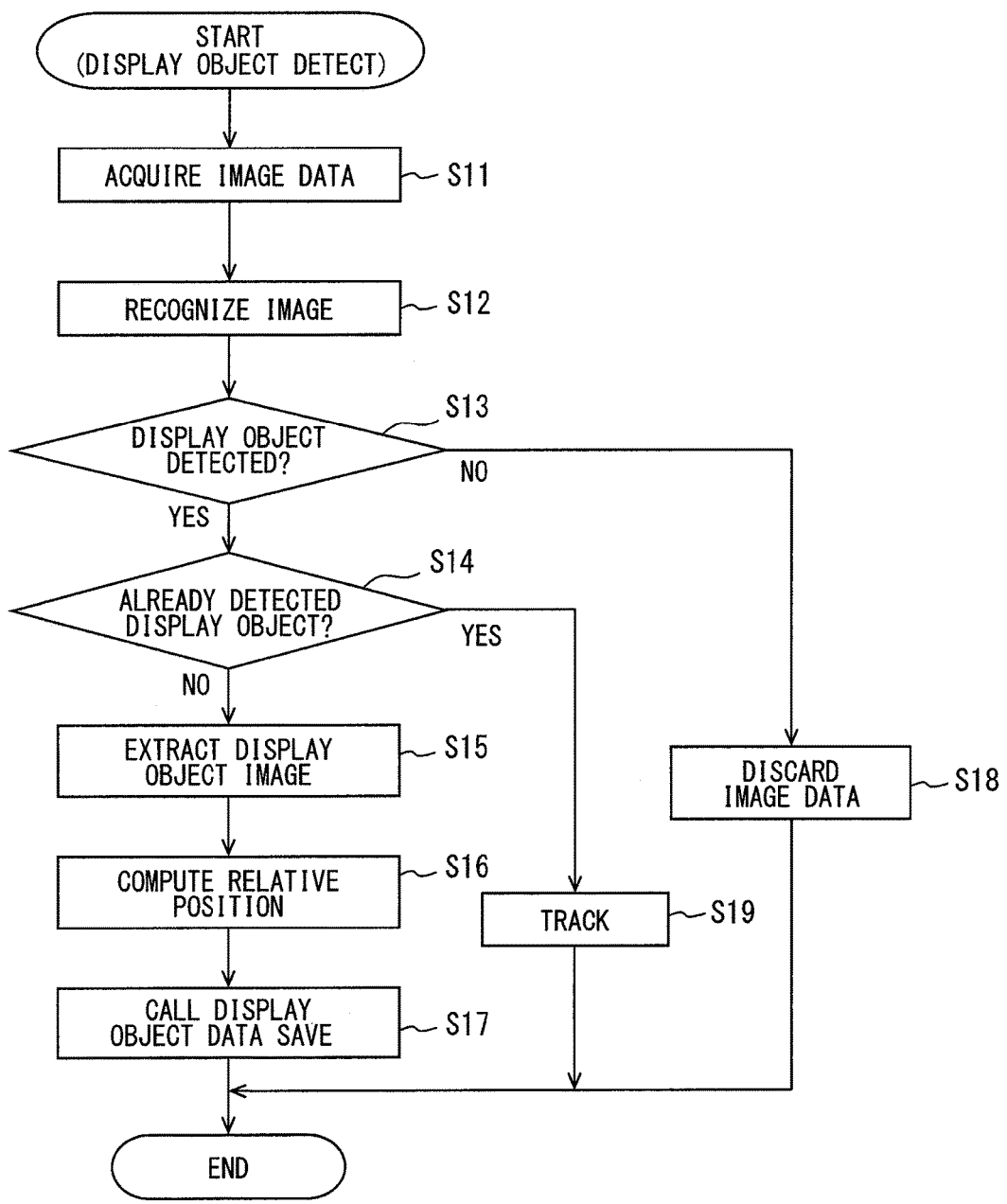
FIG. 5 is a flowchart illustrating a display object detection process performed by a display object detection section.
Figure 6:
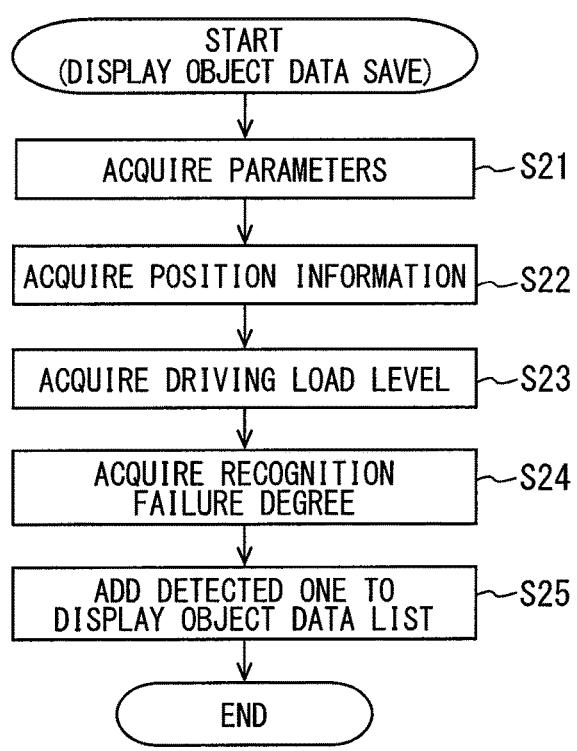
FIG. 6 is a flowchart illustrating a display object data save process performed by a save section.

The process according to the flowchart in FIG. 6 is performed in parallel with the process according to the flowchart in FIG. 5. The flowchart in FIG. 5 starts successively (every 100 milliseconds) even when the display data save process according to the flowchart in FIG. 6 is not completed. Several display objects may be detected and may be identified with original signs as the display object type. In such a case, the display data save process is called for each of the display objects. The processes may be performed on a single CPU using a known task scheduling algorithm or may be performed in parallel on several CPUs.

At S21, the save section F7 acquires the display object ID, the display object image, the relative display object position, and the display object type of the display object acquired from the display object detection section F3 and then proceeds to S22.

At S22, the save section F7 acquires the current position of the host vehicle acquired by the position detection section F1. The current position acquired at S22 represents the detection point of the display object. The save section F7 computes the position of the installation point for the display object from the current position and the relative display object position and then proceeds to S23.

At S23, the save section F7 determines a driving load level during detection of the display object from the driving load level determined by the driving load determination section F4 and then proceeds to S24. The embodiment uses the maximum driving load level that is applicable after the display object is detected until the host vehicle passes through the display object.

At S24, the save section F7 acquires the recognition failure degree rated for the display object by the recognition failure evaluation section F6 and then proceeds to S25. At S25, the save section F7 additionally adds data (display object data) associated with a series of the data found above to the display object data list D2 and then terminates the process flow.

(Automatic Display Candidate Designation Process)

With reference to a flowchart in FIG. 7, the description below explains a process (automatic display candidate designation process) the automatic display section F82 performs to select a candidate for the display object automatically displayed in the automatic display process out of display objects registered to the display object data list D2. In the description below, an automatic display candidate signifies a candidate for the display object automatically displayed in the automatic display process. The process according to the flowchart in FIG. 7 just needs to be performed successively (e.g., every 100 milliseconds) while the ignition power is turned on.

At S31, the automatic display section F82 determines whether data for a newly detected display object is added to the display object data list D2. The determination at S31 results in NO if new data is not added. The automatic display section F82 proceeds to S34. The determination at S31 results in YES if new data is added. The automatic display section F82 proceeds to S32.

At S32, the automatic display section F82 determines whether the recognition failure degree for the added display object is larger than or equal to an automatic display threshold value (e.g., 5). The determination at S32 results in YES if the recognition failure degree for the added display object is larger than or equal to the automatic display threshold value. The automatic display section F82 proceeds to S33. The determination at S32 results in NO if the recognition failure degree for the added display object is smaller than the automatic display threshold value. The automatic display section F82 proceeds to S34.

At S33, the automatic display section F82 designates the display object as the automatic display candidate. The automatic display candidate requires a condition (dismissal condition) to dismiss the display object from the automatic display candidate. The reason follows.

The display-object information degrades its usability due to a lapse of time after the detection or due to remoteness from the installation position. For example, information represented by a parking prohibition sign is useful near a point where the sign is installed. However, the information is useless at a point distant from the position where the sign is installed.

Suppose a display object is indefinitely designated as the automatic display candidate. The display-object information about the display object may be displayed even when the usability degrades as the host vehicle travels. This may rather inconvenience the driver. The embodiment can decrease possibilities of automatically displaying less usable information by attaching the dismissal condition to each automatic display candidate.

The position information or the time information may be used as the dismissal condition attached to the automatic display candidate. A combination of the position information and the time information is available. When the position information is used as the dismissal condition, traveling a specified distance from the installation point is determined to satisfy the dismissal condition. When a directional sign is used, passing through a crossing guided by the directional sign may be determined to satisfy the dismissal condition. Referencing the map data can determine the crossing corresponding to the directional sign.

When the time information is used as the dismissal condition, a lapse of specified time (one minute, ten minutes, or one hour) after the detection is determined to satisfy the dismissal condition. The length of time specified as the dismissal condition may be constant for all the display objects or may vary with the display object type. For example, the display object may represent a toll on expressways that varies with daily time periods. An effective period of the display object is determined to continue until the toll takes effect. The directional sign may require a relatively short time such as one minute.

At S34, the automatic display section F82 dismisses a display object designated as the automatic display candidate from the automatic display candidate when the display object satisfies the dismissal condition. The automatic display section F82 then terminates the process flow.

(Automatic Display Process)

Figure 8:
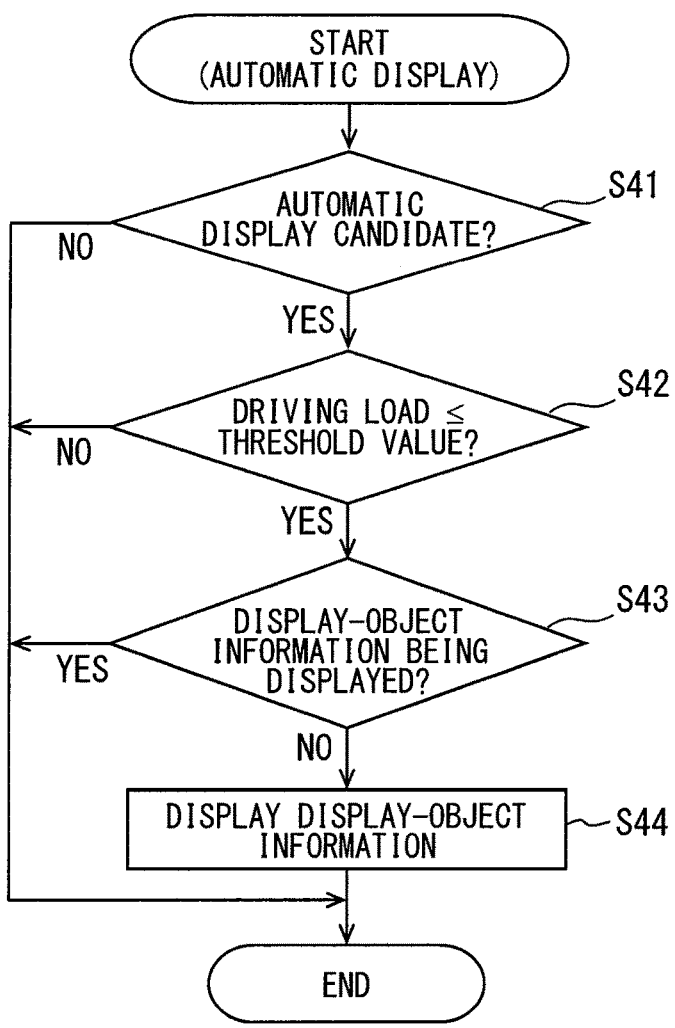
FIG. 8 is a flowchart illustrating an automatic display process performed by an automatic display section.

With reference to a flowchart in FIG. 8, the description below explains the automatic display process the automatic display section F82 performs. The process according to the flowchart in FIG. 8 just needs to be performed successively (e.g., every 100 milliseconds) while the ignition power is turned on.

At S41, the automatic display section F82 determines whether the display object data list D2 contains a display object designated as the automatic display candidate. The determination at S41 results in YES if a display object is designated as the automatic display candidate. The automatic display section F82 proceeds to S42. The determination at S41 results in NO if no display object is designated as the automatic display candidate. The automatic display section F82 terminates the process flow.

At S42, the automatic display section F82 determines whether the current driving load level determined by the driving load determination section F4 is lower than or equal to a specified threshold value (low load determination threshold value). The low load determination threshold value is used to determine that a driving load on the driver is relatively low. Any design is applicable to the low load determination threshold value. The example uses the driving load level set to 2 as the low load determination threshold value. The determination at S42 results in YES if the current driving load level is lower than or equal to 2. The automatic display section F82 proceeds to S43. The determination at S42 results in NO if the current driving load level is higher than or equal to 3. The automatic display section F82 terminates the process flow.

At S43, the automatic display section F82 determines whether the previous automatic display process currently displays the display-object information. The embodiment displays a display object image as the display-object information. According to the embodiment, the automatic display section F82 determines whether the previous automatic display process displays a display object image. The determination at S43 results in YES if a display object image is displayed. The automatic display section F82 terminates the process flow. The determination at S43 results in NO if no display object image is displayed. The automatic display section F82 proceeds to S44.

At S44, the automatic display section F82 allows the display unit 7 to display a display object image for the display object designated as the automatic display candidate and then terminates the process flow.

SUMMARY OF THE EMBODIMENT

According to the above configuration, the list display section F81 included in the drawing section F8 displays a display object list image when accepting the driver's specified manipulation. The display object list image contains information about display objects that are registered to the display object data list D2 and are arranged in descending order of the recognition failure degrees.

The display unit 7 uses a limited display area. One screen also displays a limited number of display objects (displayable count) contained in the display object list image. However, according to the above configuration, the display object list contains display objects that are detected by the display object detection section F3 and are arranged in descending order of the recognition failure degrees. The initial screen containing a display list image preferentially presents display objects in descending order of the recognition failure degrees.

The display unit 7 preferentially displays a display object highly likely to be unsuccessfully recognized. The driver can easily find a display object highly likely to be unsuccessfully recognized from the information about display objects displayed in the display object list image.

The automatic display section F82 included in the drawing section F8 automatically displays the display-object information corresponding to recognition failure degree 5 or higher out of display objects registered to the display object data list D2 when the driving load determination section F4 determines the driving load level as 2 or lower.

The driver does not recognize even the existence of a display object he or she entirely failed to recognize. The driver may highly unlikely to perform the manipulation to display the display object list image. However, the automatic display section F82 allows the display unit 7 to automatically display a display object whose recognition failure degree is set to a specified threshold value or larger. The driver can recognize the display-object information about the display object he or she failed to recognize.

While there has been described the embodiment of the present disclosure, the disclosure is not limited to the above embodiment. Embodiments described below are also included in the technical scope of the disclosure. Furthermore, the disclosure may be embodied in various modifications without departing from the spirit and scope of the disclosure.

(First Modification)

According to the above embodiment, the list display section F81 displays the display object list by reordering (sorting) display objects in descending order of the recognition failure degrees. The embodiment does not mention a process such as sorting applied to display object data itself contained in the display object data list D2.

The save section F7 according to a first modification performs a process (list data sort process) on display object data contained in the display object data list D2. The description below explains the list data sort process performed by the save section F7 according to the first modification.

The save section F7 according to the first modification manages data corresponding to each of display objects contained in the display object data list D2 in descending order of the recognition failure degrees from the beginning of the list. At S25 in FIG. 6, for example, the save section F7 adds new data to the display object data list D2 so that the new data is inserted into a list position corresponding to the recognition failure degree of the new data. For example, the save section F7 inserts new data corresponding to recognition failure degree 4 between data for the display object corresponding to recognition failure degree 5 and data for the display object corresponding to recognition failure degree 4. According to this configuration, data contained in the display object data list D2 are positioned in descending order of the recognition failure degrees. Data of the same recognition failure degree are placed in descending order of detection times.

The display object data list D2 contains data previously sorted in descending order of the recognition failure degrees while the data correspond to the display objects contained in the display object data list D2. The list display section F81 can omit a sort process when generating the display object list image (see FIG. 4). The buttons for display objects in the display list can be placed in the same order as the display object list data. This can shorten the time after the manipulation acceptance section F2 accepts the driver's manipulation to display a display object list image until the display unit 7 displays the display object list image. Namely, this can increase a response speed corresponding to the driver's manipulation.

(Second Modification)

Data may correspond to a display object whose recognition failure degree is lower than or equal to a specified threshold value (visibility threshold value). The save section F7 may not add such data to the display object data list D2. The visibility threshold value is used to determine whether the driver visually recognizes the display object. For example, the embodiment uses the recognition failure degree set to 1 as the visibility threshold value.

The recognition failure degree smaller than or equal to the specified threshold value (visibility threshold value) is attached to a display object the driver is highly likely to visually recognize. The driver is highly likely to visually recognize the contents of a display object the driver already visually recognizes. Displaying information (a button in this example) corresponding to the display object in the display object list image is considered to give relatively less usability to the driver. Increasing the number of buttons corresponding to many display objects displayed in the display list image prevents the driver from easily finding information about an unsuccessfully recognized display object or a display object the driver needs to find.

The configuration of the second modification prevents the display object data list D2 from additionally including display object data whose recognition failure degree is lower than or equal to the visibility threshold value. The list display section F81 generates a display object list image based on the display object data list D2. The display object list image also does not display information about a display object whose recognition failure degree is lower than or equal to the visibility threshold value.

The configuration according to the second modification can prevent information less usable for the driver from being displayed in the display object list image and decrease the number of display objects displayed in the display object list image. The driver can easily find information about an unsuccessfully recognized display object or a display object the driver needs to find. An additional advantage is to reduce the amount of data as the display object data list to be saved in the memory 9.

As above, the display object data list D2 does not additionally include data for a display object whose recognition failure degree is lower than or equal to the visibility threshold value. The display object list image does not display a display object whose recognition failure degree is lower than or equal to the visibility threshold value. However, the configuration is not limited thereto. A display object detection list may additionally save data for a display object whose recognition failure degree is lower than or equal to the visibility threshold value. A process may be performed periodically (e.g., at a specified time interval) to delete data for a display object whose recognition failure degree is lower than or equal to the visibility threshold value.

The list display section F81 may generate a display object list image without using a display object whose recognition failure degree is lower than or equal to the visibility threshold value. The display object list image may be generated using a parent population, namely, display object data for a display object whose recognition failure degree is higher than the visibility threshold value. This configuration can also provide the same effect as the second modification described above.

(Third Modification)

The list display section F81 may adjust the order of display objects in the display object list based on not only the recognition failure degree but also whether the driver can find usefulness in the display-object information about a display object corresponding to the display object data contained in the display object data list D2. Configuration of a third modification will be described below.

Figure 9:
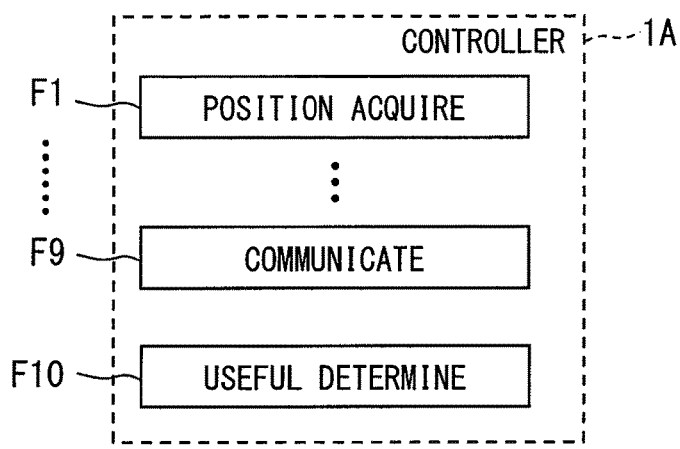
FIG. 9 is a block diagram exemplarily illustrating a schematic configuration of a controller according to a third modification.

As in FIG. 9, a controller 1a according to the third modification includes a usefulness determination section F10 in addition to the function blocks, namely, the position detection section F1 through the communication section F9 included in the controller 1 described in the embodiment. The usefulness determination section F10 determines whether the driver finds usefulness in the display-object information about a display object corresponding to each of the display object data contained in the display object data list D2.

More specifically, the usefulness determination section F10 performs a process (usefulness determination process) to determine whether the display-object information about a display object is useful for the driver based on a distance between the current position of the host vehicle and the installation position of the display object, and the display object type of the display object.

The usefulness of the display-object information for the driver varies with a distance between the current position of the host vehicle and the installation position of the display object, or the display object type of the display object. For example, the information on a directional sign is useful for the driver until passing through a crossing guided by the directional sign. However, the information is less useful after passing through the crossing. An effective range may be predetermined for the regulation content of the regulatory sign such as a parking prohibition sign according to an auxiliary sign installed near the regulatory sign. In this case, the display-object information about the display object is useful in the effective range but is less useful outside the effective range.

The usefulness determination section F10 determines an effective range of the display object according to the display object type of the display object. If the host vehicle exists in the effective range, the usefulness determination section F10 determines that the display-object information about the display object is useful for the driver. If the host vehicle does not exist in the effective range, the usefulness determination section F10 determines that the display-object information about the display object is useless for the driver.

The effective range depends on each display object type. For example, the effective range of a directional sign is applicable from the detection point of the directional sign to the crossing guided by the directional sign. The effective range of a regulatory sign such as a parking prohibition sign depends on an auxiliary sign installed near the regulatory sign. If no auxiliary sign is installed, the effective range is applicable within a specified distance (e.g., 50 m) from the installation point of the regulatory sign. The effective ranges can be predetermined for the other display object types.

The display object data according to the third modification includes a usefulness flag, namely, a process-oriented flag to indicate whether the display object is useful. The usefulness determination section F10 turns on the usefulness flag for data of a display object whose display-object information is determined to be useful. The usefulness determination section F10 turns off the usefulness flag for data of a display object whose display-object information is determined to be useless. The usefulness flag is initially turned on when display object data is generated.

The usefulness determination process is performed periodically (e.g., every 200 milliseconds) on display object data contained in the display object data list to dynamically update the usefulness flag assigned to each display object data. The usefulness determination process may be performed only on display object data whose usefulness flag is turned on.

The list display section F81 according to the third modification generates a display object list image containing the display object list whose top position is preferentially reserved for a display object for which the usefulness flag is turned on and the recognition failure probability is high. The list display section F81 then allows the display unit 7 to display the display object list image. Namely, the display unit 7 preferentially displays a display object that is useful for the driver and is highly unlikely to be recognized.

For example, the display object list can first position display objects assigned the usefulness flag turned on in descending order of the recognition failure degrees and subordinately position display object data determined to be useless in descending order of the recognition failure degrees.

Figure 10:
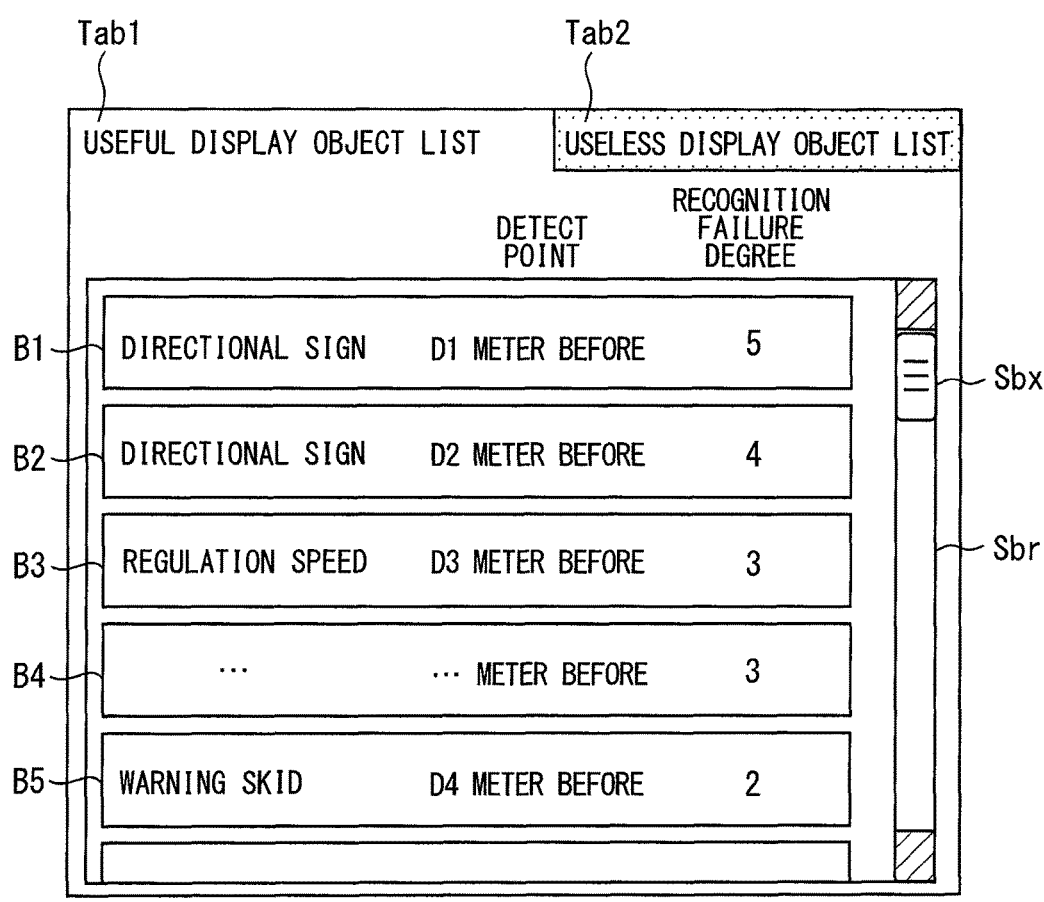
FIG. 10 is a diagram of exemplarily illustrating a display object list image according to the third modification.

As in FIG. 10, the list display section F81 may use tabs to switch between display object lists. In this case, one display object list uses the parent population corresponding to data of a display object whose usefulness flag is turned on. Another display object list uses the parent population corresponding to data of a display object whose usefulness flag is turned off. In the description below, a useful display object list represents the display object list that uses the parent population corresponding to data of a display object whose usefulness flag is turned on. A useless display object list represents the display object list that uses the parent population corresponding to data of a display object whose usefulness flag is turned off.

The display object list image in FIG. 10 includes tab switches Tab1 and Tab2 in addition to the buttons B1 through B5 corresponding to display objects registered to the display object data list D2. The tab switch Tab1 displays the useful display object list. The tab switch Tab2 displays the useless display object list. The driver can select one of the tab switches Tab1 and Tab2 (by touching) to display the display object list corresponding to the touched tab switch.

FIG. 10 illustrates a display screen when the driver selects the tab switch Tab1. The screen shows a display object list of a group of data for display objects whose usefulness flags are turned on. The tab switch Tab2 is not currently selected by the driver and uses a display mode (color or brightness) different from the tab switch Tab1 to visualize which tab switch is currently selected. In FIG. 10, the tab switch Tab2 is hatched to indicate that it is not selected.

Based on the driver's manipulation, the list display section F81 displays an initial screen as the display object list image. The initial screen displays the display object list of a group of data for display objects whose usefulness flag are turned on The configuration according to the third modification preferentially displays a display object the driver is highly unlikely to recognize. The configuration can display information by distinguishing the information about a display object useful for the driver from the information about an already useless display object. The configuration determines whether the information is useful, based on the host vehicle position. The information about a useful display object is displayed in preference to the information about a useless display object. The driver can be preferentially provided with the information corresponding to the host vehicle position.

The driver may need to confirm the direction of a road where the host vehicle travels after passing through the crossing guided by a directional sign. In such a case, the display mode in FIG. 10 displays the useless display object list, enabling the driver to confirm the contents of the directional sign that guides the already passed crossing.

The useful display object list presents display objects in descending order of the recognition failure degrees so that the display object assigned the highest recognition failure degree is placed at the top of the list. However, the useless display object list may present the display objects in descending order of detection times. The information about an already passed display object can be easily found after the information becomes useless.

(Fourth Modification)

The save section F7 may configure display object data in the display object data list depending on whether the usefulness flag is turned on. The save section F7 may delete display object data assigned the usefulness flag turned off from the display object data list. This can limit the number of display objects displayed in the display object list image and allow the driver to easily find the necessary information.

(Other Modifications)

The above configuration displays the display object image as the display-object information but is not limited thereto. An icon image corresponding to the display object type may be saved in the memory 9. The icon image corresponding to a display object may be displayed as an image to represent the contents of the display object. The display-object information may use text to display the contents of a display object.

The embodiment equates the time to determine the driving load level with the time to pass through the installation point for the display object but is not limited thereto. The driving load level may be determined when the distance between the host vehicle and the installation point reaches an out-of-view distance after the display object is detected. The out-of-view distance allows the driver to lose a view of the display object as the host vehicle approaches the display object while the driver's face is directed to the front of the host vehicle. The out-of-view distance may be computed based on a height of the display object from the road surface or may be predetermined as a specified value (e.g., 10 m).

Figure 7:
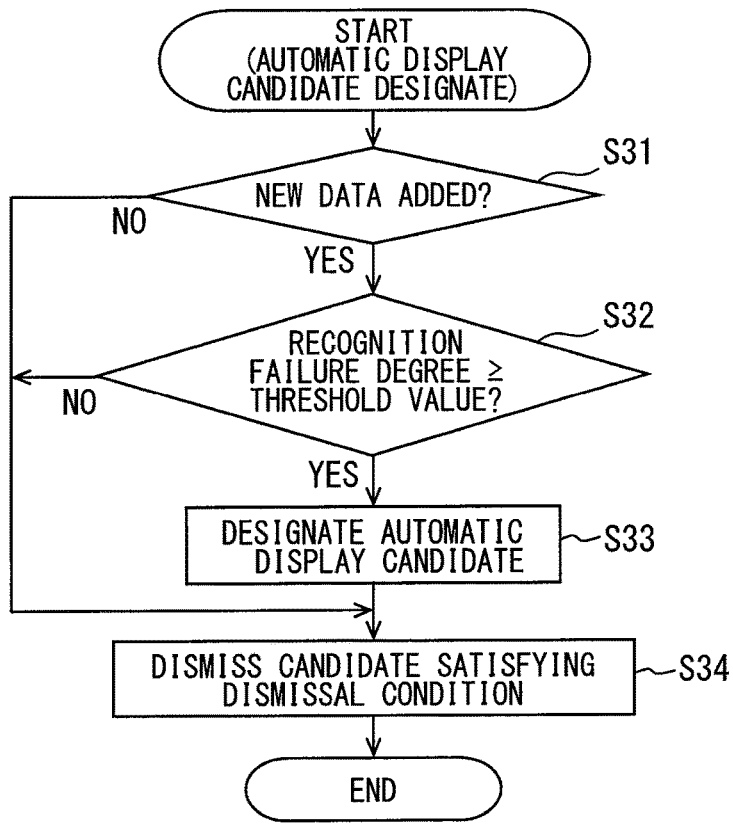
FIG. 7 is a flowchart illustrating an automatic display candidate designation process performed by an automatic display section.

At S32 in FIG. 7, the automatic display section F82 may determine that the display object is assigned the recognition failure degree is higher than or equal to a specified threshold value. In this case, data for that display object may be transmitted to an information collection server via the communication apparatus 10. A database may be created by collecting data for the display object and information about a point that causes the recognition failure degree to be higher than or equal to the specified threshold value. The database is useful to specify a point or a corresponding display object the driver is likely to fail to recognize. This can provide a countermeasure such as changing the installation position of the display object the driver is likely to fail to recognize so that the driver can easily recognize the display object.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A display-object information displaying apparatus comprising:
   a display object detection circuit that detects a plurality of display objects each predetermined as a detection target, from image data captured by a front capture apparatus to capture a front of a vehicle;
   a recognition failure evaluation circuit that evaluates a recognition failure probability about each of the display objects detected by the display object detection circuit by assigning each of the display objects with one of a plurality of grades in failure probability, the recognition failure probability being a probability that a driver of the vehicle fails to recognize each of the display objects;
   a save circuit that causes a memory to save display object data corresponding to each of the display objects, the display object data containing display-object information presented by each of the display objects detected by the display object detection circuit and the recognition failure probability evaluated with respect to each of the display objects by the recognition failure evaluation circuit; and
   a drawing circuit that causes a display unit to display the display-object information about each of the display objects based on the display object data that corresponds to each of the display objects and is saved in the memory,
   wherein the drawing circuit causes the display unit to display the display-object information about the display object assigned a higher recognition failure probability preferentially among the display objects corresponding to the display object data saved in the memory.

2. The display-object information displaying apparatus according to claim 1,
   wherein the drawing circuit includes an automatic display circuit that causes the display unit to automatically display the display-object information about the display object whose recognition failure probability is determined to be higher than or equal to a predetermined automatic display threshold value.

3. The display-object information displaying apparatus according to claim 2, further comprising:
a driving load determination circuit (F4) that determines a driving load level of a driving load on the driver,
wherein the automatic display circuit causes the display unit to display the display-object information about the display object whose recognition failure probability is higher than or equal to the predetermined automatic display threshold value based on a condition that the driving load level determined by the driving load determination circuit becomes lower than or equal to a predetermined low load determination threshold value.

4. The display-object information displaying apparatus according to claim 1, further comprising
an eye direction detection circuit that detects a driver's eye direction from image data captured by a face capture apparatus that captures a range including a driver's face,
wherein:
the display object detection circuit specifies a relative position of the display object in relation to the vehicle based on the image data captured by the front capture apparatus; and
the recognition failure evaluation circuit evaluates the recognition failure probability based on the eye direction and the relative position of the display object specified by the display object detection section-circuit.

5. The display-object information displaying apparatus according to claim 1, further comprising
a manipulation acceptance circuit that accepts manipulation performed by the driver,
wherein:
the drawing circuit includes a list display circuit that displays a display object list of the display objects detected by the display object detection circuit to list the display objects in descending order when the manipulation acceptance circuit accepts a specified manipulation; and
the list display circuit displays the display object with the higher recognition failure probability at a higher order in the display object list.

6. A display-object information displaying apparatus comprising:
a display object detection circuit that detects display objects each predetermined as a detection target, from image data captured by a front capture apparatus to capture a front of a vehicle;
a recognition failure evaluation circuit that evaluates a recognition failure probability about each of the display objects detected by the display object detection circuit, the recognition failure probability being a probability that a driver of the vehicle fails to recognize each of the display objects;
a save circuit that causes a memory to save display object data corresponding to each of the display objects, the display object data containing display-object information presented by each of the display objects detected by the display object detection circuit and the recognition failure evaluation circuit;
a drawing circuit that causes a display unit to display the display-object information about each of the display objects based on the display object data that corresponds to each of the display objects and is saved in the memory; and
a manipulation acceptance circuit that accepts manipulation performed by the driver,
wherein:
the drawing circuit causes the display unit to the display the display-object information about the display object assigned a higher recognition failure probability preferentially among the display objects corresponding to the display object data saved in the memory;
the drawing circuit includes a list display circuit that displays a display object list of the display objects detected by the display object detection circuit to list the display objects in descending order when the manipulation acceptance circuit accepts a specified manipulation; and
the list display circuit displays the display object with the higher recognition failure probability at a higher order in the display object list.

7. The display-object information displaying apparatus according to claim 6, wherein
the list display circuit prevents the display object list from displaying the display object whose recognition failure probability is lower than or equal to a predetermined visibility threshold value that is used to determine that the driver visually recognizes the display object.

8. The display-object information displaying apparatus according to claim 6, further comprising
a usefulness determination circuit that determines whether the display-object information about the display object is useful to the driver, with regard to each of the display objects corresponding to the display object data saved in the memory,
wherein the list display circuit preferentially displays, at the higher order in the display object list, the display object that is determined by the usefulness determination circuit to be useful to the driver and is assigned the higher recognition failure probability.

9. The display-object information displaying apparatus according to claim 8, further comprising
a position acquisition circuit that acquires a current position of the vehicle, wherein:
the display object detection circuit specifies a type of the display object and a relative position of the display object in relation to the vehicle based on the image data captured by the front capture apparatus;
the save circuit computes an installation point of the display object detected by the display object detection circuit from the relative position of the display object in relation to the vehicle and the current position of the vehicle when the display object detection circuit detects the display object;
the display object data about each of the display objects contains not only the display-object information and the recognition failure probability with respect to the display object corresponding to the display object data, but also the installation point of the display object computed by the save circuit and the type of the display object specified by the display object detection circuit; and
the usefulness determination circuit
settles an effective range of each of the display objects corresponding to the display object data saved in the memory based on the type and the installation point of the display object, and
determines that the display-object information about the display object is useful to the driver when the current position of the vehicle acquired by the position acquisition circuit exists in the effective range, whereas
determining that the display-object information about the display object is useless to the driver when the current position of the vehicle acquired by the position acquisition circuit does not exist in the effective range.

10. The display-object information displaying apparatus according to claim 6,
wherein:
the memory stores a list-structured display object data list that contains the display object data;
when the display object detection section-circuit detects the display object, the save circuit adds the display object data corresponding to the display object to the display object data list stored in the memory; and
the list display circuit generates an image of the display object list and displays the image based on the display object data contained in the display object data list.

11. The display-object information displaying apparatus according to claim 10,
wherein the display object data list contains the display object data by sorting the display object data in descending order of the recognition failure probability attached to the display object data.

12. A display-object information displaying apparatus comprising:
a display object detection circuit that detects display objects each predetermined as a detection target, from image date captured be a front capture apparatus to capture a front of a vehicle;
a recognition failure evaluation circuit that evaluates a recognition failure probability about each of the display objects detected by the display object detection circuit, the recognition failure probability being a probability that a driver of the vehicle fails to recognize each of the display objects;
a save circuit that causes a memory to save display object data corresponding to each of the display objects, the display object data containing display-object information presented by each of the display objects detected by the display object detection circuit and the recognition failure probability evaluated with respect to each of the display objects by the recognition failure evaluation circuit;
a drawing circuit that causes a display unit to display the display-object information about each of the display objects based on the display object data that corresponds to each of the display objects and is saved in the memory; and
a driving load determination circuit that determines a driving load level of a driving load on the driver, wherein
the drawing circuit causes the display unit to display the display-object information about the display object assigned a higher recognition failure probability preferentially among the display objects corresponding to the display object data saved in the memory,
the drawing circuit includes an automatic display circuit that causes the display unit to automatically display the display-object information about the display object whose recognition failure probability is determined to be higher than or equal to a predetermined automatic display threshold value, and
the automatic display circuit causes the display unit to display the display-object information about the display object whose recognition failure probability is higher than or equal to the predetermined automatic display threshold value based on a condition that the driving load level determined by the driving load determination circuit becomes lower than or equal to a predetermined low load determination threshold value.

13. The display-object information displaying apparatus according to claim 12,
wherein the driving load determination circuit determines the driving load level by comparing a sensor value with a predetermined threshold value, the sensor value being output from at least one sensor to detect a parameter representing a travel state of the vehicle.

14. The display-object information displaying apparatus according to claim 12,
wherein the recognition failure evaluation circuit evaluates the recognition failure probability based on the driving load level determined by the driving load determination circuit.

15. A display-object information displaying apparatus, comprising:
a display object detection circuit that detects a plurality of display objects each predetermined as a detection target, from image data captured by a front capture apparatus to capture a front of a vehicle;
a recognition failure evaluation circuit that evaluates a recognition failure probability about each of the display objects detected by the display object detection circuit by assigning each of the display objects with one of a plurality of grades in failure probability, the recognition failure probability being a probability that a driver of the vehicle fails to recognize each of the display objects; and
a drawing circuit that causes a display unit to display preferentially an image corresponding to the display object, which is evaluated by the recognition failure evaluation circuit to be assigned a higher recognition failure probability among the display objects detected by the display object detection circuit.

16. The display-object information displaying apparatus according to claim 15, further comprising a driving load determination circuit that determines a driving load level of a driving load on the driver based on a sensor value output from at least one sensor to detect a parameter representing a travel state of the vehicle, wherein
the recognition failure evaluation circuit evaluates the recognition failure probability based on the driving load level determined by the driving load determination circuit.

17. The display-object information displaying apparatus according to claim 15, further comprising a usefulness determination circuit that determines whether an image corresponding to each of the display objects is useful to the driver, wherein
the display object detection circuit specifies a relative position of the display object in relation to the vehicle based on the image data captured by the front capture apparatus, and
the usefulness determination circuit
determines that the image corresponding to each of the display objects is useful to the driver when the vehicle exists in an effective range of each of the display objects based on the relative position of each of the display objects specified by the display object detection unit, and
determines that the image corresponding to each of the display objects is useless to the driver when the vehicle does not exist in the effective range.

18. The display-object information displaying apparatus according to claim 17, further comprising an eye direction detection circuit that detects a driver's eye direction from image data captured by a face capture apparatus that captures a range including a driver's face, wherein
the recognition failure evaluation circuit evaluates the recognition failure probability based on the relative position of each of the display objects specified by the display object detection unit and the eye direction detected by the eye direction detection circuit.

19. The display-object information displaying according to claim 15, further comprising a save circuit that causes a memory to save display object data corresponding to each of the display objects, the display object data containing the recognition failure probability evaluated with respect to each of the display objects by the recognition failure evaluation circuit, wherein
the drawing circuit causes the display unit to display the image corresponding to the display object assigned a higher recognition failure probability preferentially among the display objects corresponding to the display object data saved in the memory.

20. A display-object information displaying apparatus, comprising:
at least one memory storing instructions; and
at least one processor that executes the instructions to cause the following to be performed:
detecting a plurality of display objects each predetermined as a detection target, from image data captured by a front capture apparatus to capture a front of a vehicle;
evaluating a recognition failure probability about each of the detected display objects by assigning each of the display objects with one of a plurality of grades in failure probability, the recognition failure probability being a probability that a driver of the vehicle fails to recognize each of the display objects; and
displaying, in a display unit, preferentially an image corresponding to the display object, which is evaluated to be assigned a higher recognition failure probability among the detected display objects.

* * * * *